June 16, 1925.
C. C. NORDQUIST
1,542,470
COMBINATION FRUIT TOOL
Filed Nov. 15, 1924    2 Sheets-Sheet 1
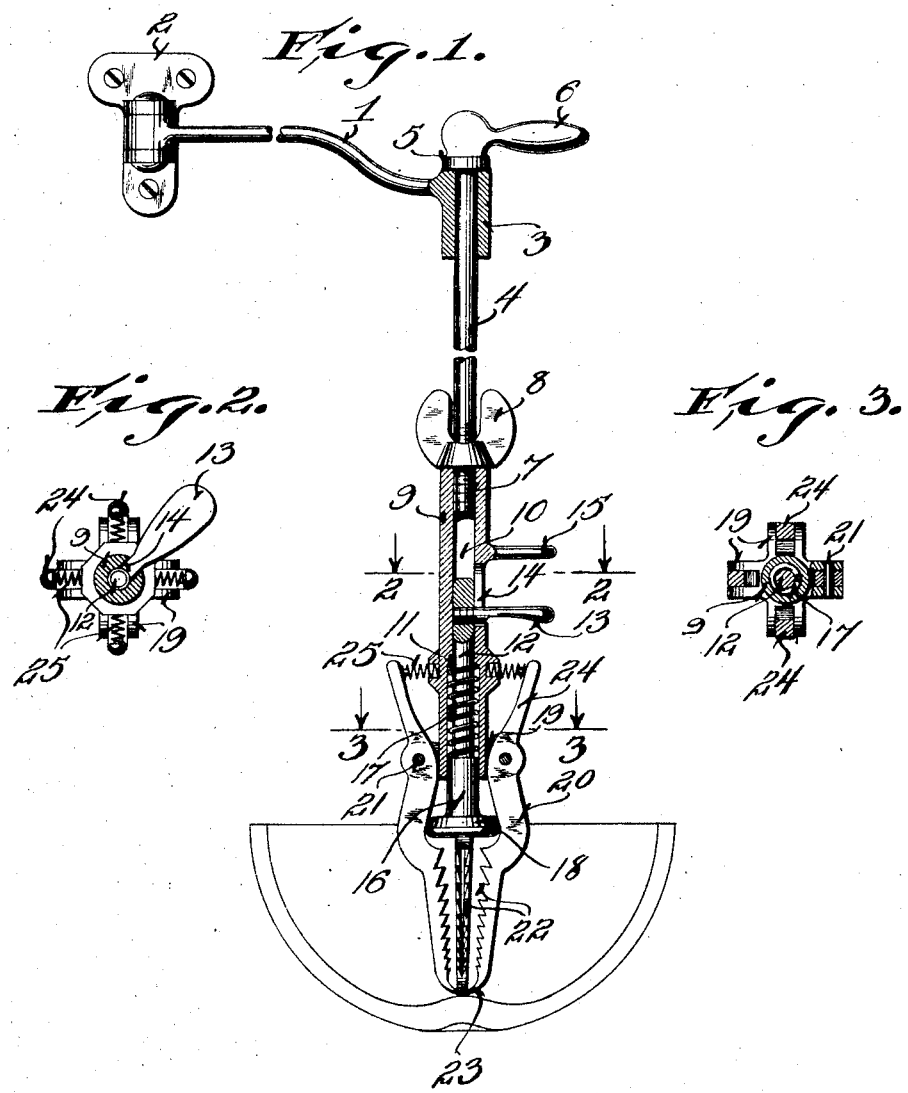

June 16, 1925.

C. C. NORDQUIST

COMBINATION FRUIT TOOL

Filed Nov. 15, 1924

Inventor!
Carl C. Nordquist

Patented June 16, 1925.

1,542,470

UNITED STATES PATENT OFFICE.

CARL C. NORDQUIST, OF MENOMINEE, MICHIGAN.

COMBINATION FRUIT TOOL.

Application filed November 15, 1924. Serial No. 750,099.

*To all whom it may concern:*

Be it known that I, CARL C. NORDQUIST, a citizen of the United States, and resident of Menominee, in the county of Menominee and State of Michigan, have invented certain new and useful Improvements in Combination Fruit Tools; and I do hereby declare that the following is a full, clear, and exact description thereof.

This invention relates to combination fruit tools, and is particularly directed to fruit tools adapted to operate upon grape fruit and similar fruit.

For the purpose of this description, the term grape fruit will be used, but it is understood that the term will be used in an illustrative sense rather than a limiting sense and to aid in simplifying the description.

In preparing grape fruit, it has been the practice to leave the central core in the fruit or else to cut it out by hand. This necessarily causes the loss of a large amount of pulp and juice and is very wasteful. Where grape fruit are prepared in large quantities for instance in hotels, restaurants, hospitals, and even in private homes, this waste is material and also the prepared fruit is not in as attractive appearance as is desirable.

This invention is designed to overcome the above noted defects, and objects of this invention are to provide grape fruit tools which may be easily operated in a simple and efficacious manner, which rigidly grip the center core, if desired, and thus will hold the grape fruit in position, and which may be quickly manipulated to remove the central core.

Further objects are to provide a device which is adjustable, which is adapted to be held in the hands of the operator, if desired, or mounted upon a swinging bracket, and which may be quickly operated in a simple manner.

Embodiments of the invention are shown in the accompanying drawings, in which:—

Figure 1 is a vertical elevation partly in section showing one form of the device.

Figure 2 is a transverse sectional view on the line 2—2 of Figure 1.

Figure 3 is a transverse sectional view on the line 3—3 of Figure 1.

Figure 4:
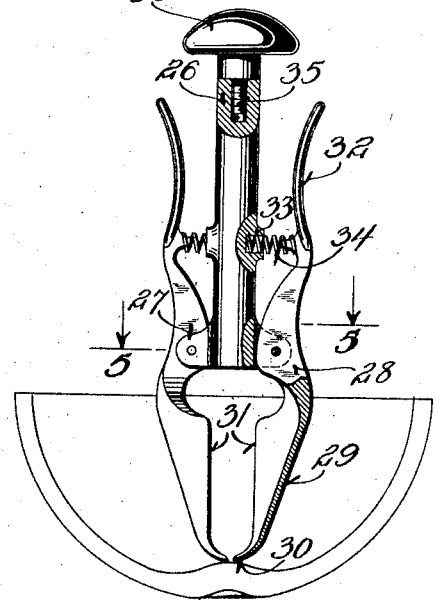
Figure 4 is a vertical elevation, partly in section, of a further form of the invention.

The form of the invention illustrated in Figures 1 to 3 inclusive will first be described. In this form a swinging bracket 1 is provided and is pivotally carried by means of a clip 2 secured to the wall. This hinged bracket is provided with an elongated apertured hub through which the rod 4 extends. This rod is freely slidable in the hub and is provided with a boss or shoulder 5 at its upper portion, and with a manipulating handle 6. The lower end of the rod is threaded, as indicated at 7, and is preferably provided with a wing nut 8.

The lower portion of the apparatus is apertured and is threaded and screwed upon the threaded portion 7 of the rod, as shown in Figure 1. This portion comprises the body 9 which, as stated, is screwed upon the rod and locked in place by the wing nut. The aperture 10 in the body portion extends completely therethrough and is enlarged so as to provide a shoulder 11, as clearly shown in the drawing. This aperture 10 carries a slidably mounted plunger 12 which is equipped with a manipulating handle 13 extending through a slot 14. A stationary handle 15 is mounted in alignment with the handle 13 so that the two handles may be gripped between the thumb and finger of an operator. The plunger or rod 12 is provided with an enlarged portion 16, and a helical spring 17 is mounted between such enlarged portion and the shoulder 11 to thus urge the plunger downwardly. The lower end of the plunger is provided with a disk-like beveled cam member 18 for a purpose hereinafter to appear.

The body portion 9 of the device is provided with a plurality of pairs of spaced ears 19 (see Figures 2 and 3). Between these ears, levers 20 are mounted and are pivotally secured by means of pins 21. The lower ends of these levers are bowed outwardly to accommodate the cam member 18 and are provided with serrated jaws 22 at their lower portions. These serrated jaws are preferably provided with double rows of very sharp points or projections and have inwardly curved tips 23. The upper ends of the levers 20 are provided with arms 24, and springs 25 are fitted over pins carried by such arms and set within sockets formed in the member 9.

In using this device, the arms 13 and 15 are grasped between the thumb and finger of the operator and the cam 18 is elevated thus opening the jaws 22. A half grape fruit is then positioned below the device and the entire device is slid downwardly into the position shown in Figure 1. The handles 13 and 15 are then released and the gripping jaws 22 securely engage the central core of the grape fruit. Thereafter, the grape fruit may be readily slit or otherwise operated upon by a knife or other instrument to sever the pulp from the partition walls or rim. The handle 6 is rotated to bring the successive portions of the grape fruit into position to be operated upon. After the grape fruit has been properly cut, the device is raised thus removing the core and leaving the grape fruit in a neat and attractive finished condition without loss of juice, without bruising or without any other damage.

Figure 5:
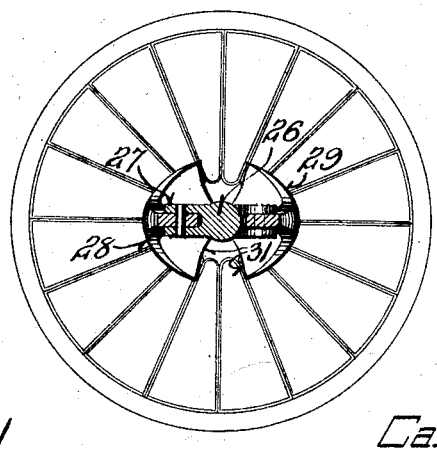
Figure 5 is a transverse sectional view on the line 5—5 of Figure 4.

In the form shown in Figures 4 and 5, the device is illustrated as adapted for holding within the hand of an operator although, as will presently appear, it may be attached to the spindle or slidable rod 4. In this form of the invention, a body portion or stem 26 is provided with pairs of spaced ears 27 between which levers 28 are pivoted. These levers are provided with spoon-like portions 29 which terminate at their lower ends in inwardly turned sharpened jaws 30. The marginal portions 31 of these spoonlike members are sharp, as may be seen from Figure 5, and are adapted to cut the partitions and thus sever the core of the grape fruit upon a slight rotary motion of the device after the proper cutting with a knife has taken place. The levers 28 are extended upwardly and are provided with manipulating handles 32. The portion 26 is provided with an aperture 33 within which a spring 34 is positioned. This spring extends through the aperture 33 and engages the levers 28 on opposite sides thereof, such springs preferably being fitted over projections on the levers, as shown in Figure 4. The upper part of the body portion 26 is apertured and is threaded, and adapted to receive the threaded stem 35 of a hand grip 36.

In using this device the handles 32 are gripped and drawn towards each other thus opening the spoon cutters or holders 39. The device is then passed into the grape fruit and the handles 32 released. The operator grasps the handle 36 with one hand and with a knife in the other hand properly cuts and prepares the grape fruit. Thereafter, the device may be given a slight rotary motion, thus causing the sharp edges 31 and the sharp points 30 to completely sever the core from the grape fruit.

It is also intended that the device illustrated in Figures 4 and 5 may be used alternately with the apparatus illustrated in Figure 1. For instance, the member 9 of Figure 1 may be removed and the stem 26 screwed on to the lower end of the rod or spindle 4.

It will thus be seen that a combination fruit tool has been provided which is highly effective in holding and preparing a grape fruit or similar article, which may be most easily manipulated, and which will securely hold the grape fruit in position while it is being operated upon, and which will easily and quickly remove the core without damaging the remaining portions of the grape fruit.

Although the invention has been described in considerable detail, it is to be understood that the invention may be variously embodied and is, therefore, to be limited only as claimed.

I claim:

1. A fruit tool comprising a body portion, a handle secured thereto, a plurality of levers pivotally carried by said body portion and having gripping jaws, springs urging said jaws towards each other, and means for opening said jaws.

2. A fruit tool comprising an elongated stem, a manipulating handle detachably secured to said stem, a plurality of levers pivotally secured to said stem and having gripping jaws provided with sharpened portions adapted to grip the core of a grape fruit, springs urging said jaws towards each other, and means for opening said jaws.

3. A fruit tool comprising a body portion having an apertured threaded end, a manipulating handle having a portion screwed into said threaded aperture, a plurality of jaws pivoted to said body portion, and adapted to grip the core of a fruit, springs urging said jaws towards closed position, cam means for releasing said jaws, and an operating handle secured to said cam means.

4. A fruit tool comprising a body portion having an apertured threaded end, a manipulating handle having a portion screwed into said threaded aperture, a plurality of jaws pivoted to said body portion and adapted to grip the core of a fruit, springs urging said jaws towards closed position, a cam for simultaneously engaging said jaws to open them, and a handle secured to said cam means.

5. A fruit tool comprising a body portion having an apertured threaded end, a manipulating handle having a portion screwed into said threaded aperture, a plurality of jaws pivoted to said body portion and adapted to grip the core of a fruit, springs urging said jaws towards closed position, a cam for simultaneously engaging said jaws to open them, a plunger secured to said cam and slidably carried within said body portion, said body portion having a slot adjacent said plunger, and a handle secured to said plunger and projecting outwardly through said slot.

6. A fruit tool comprising a pivotally supported bracket having an apertured end, a rod slidably mounted within said apertured end and having a manipulating handle secured to its upper end, a stem detachably secured to the lower end of said rod, a plurality of levers pivoted to said stem and having gripping jaws adapted to engage the core of a fruit, springs for urging said jaws towards closed position, and means for opening said jaws.

7. A fruit tool comprising a bracket adapted for rigid attachment to a wall, an arm pivotally carried by said bracket and having an elongated apertured hub at its outer end, a rod slidably mounted within said hub and having a manipulating handle at its upper end, a tubular member carried by the lower end of said rod, a plurality of radially arranged gripping jaws pivoted to said tubular member, springs urging said jaws towards closed position, a plunger slidably mounted within said tubular member and having a cam shaped lower end and positioned between said jaws and adapted to open said jaws when said cam is raised, a spring urging said cam downwardly, and a manipulating handle carried by said plunger and projecting through a slot in said tubular member.

In testimony that I claim the foregoing I have hereunto set my hand at Menominee, in the county of Menominee and State of Michigan.

CARL C. NORDQUIST.